United States Patent [19]

Moraw et al.

[11] 4,313,984

[45] Feb. 2, 1982

[54] LAMINATED IDENTITY CARD HAVING SEPARATION-RESISTANT LAMINAE AND METHOD OF MANUFACTURING SAME

[75] Inventors: Roland Moraw; Renate Schädlich, both of Wiesbaden, Fed. Rep. of Germany

[73] Assignee: Hoechst Aktiengesellschaft, Frankfurt am Main, Fed. Rep. of Germany

[21] Appl. No.: 105,258

[22] Filed: Dec. 19, 1979

[30] Foreign Application Priority Data

Dec. 30, 1978 [DE] Fed. Rep. of Germany ....... 2856833

[51] Int. Cl.³ .................. B32B 3/24; B32B 27/06
[52] U.S. Cl. ................................. 428/13; 40/2.2; 156/298; 283/7; 283/8 R; 428/138; 428/140; 428/192; 428/203; 428/211; 428/332; 428/916
[58] Field of Search ............... 428/13, 137, 138, 140, 428/518, 916, 511, 192, 195, 198, 201, 203, 332, 211; 283/7, 8 R; 427/7; 156/298; 40/2.2

[56] References Cited

U.S. PATENT DOCUMENTS

| | | | |
|---|---|---|---|
| 3,413,171 | 11/1968 | Hannm | 428/916 |
| 3,614,839 | 10/1971 | Thomas | 40/2.2 |
| 4,096,015 | 6/1978 | Kawamata et al. | 428/916 |
| 4,119,361 | 10/1978 | Greenaway | 283/7 |

FOREIGN PATENT DOCUMENTS

| | | |
|---|---|---|
| 2163943 | 7/1972 | Fed. Rep. of Germany . |
| 2308876 | 9/1973 | Fed. Rep. of Germany . |
| 961181 | 5/1950 | France . |
| 1347240 | 11/1963 | France . |
| 2114705 | 6/1972 | France . |
| 2117055 | 7/1972 | France . |

Primary Examiner—Paul J. Thibodeau
Attorney, Agent, or Firm—Schwartz, Jeffery, Schwaab, Mack, Blumenthal & Koch

[57] ABSTRACT

Identity card comprising top and bottom outer transparent thermoplastic cover layers laminated to a thermoplastic core comprising a pair of core layers having interposed therebetween a reinforcing support layer which is dimensionally stable under the temperature and pressure conditions utilized to laminate the layers to each other; the cover layers and core layers being formed of thermoplastic polymeric material such as polyvinyl chloride; the support layer being permeable to the thermoplastic material of the surrounding core layers such that the core layers are firmly bonded to each other through the support layer when the layers are laminated to each other; the card carrying at suitable points on at least one layer information serving to identify the cardholder and further carrying security markings, such as guilloche figures, for protection against forgeries.

13 Claims, 2 Drawing Figures

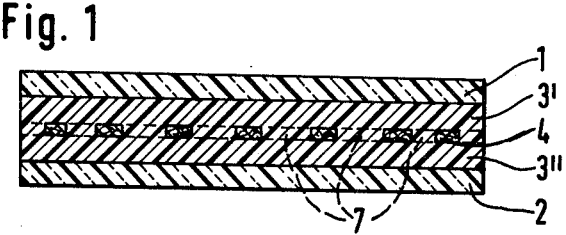
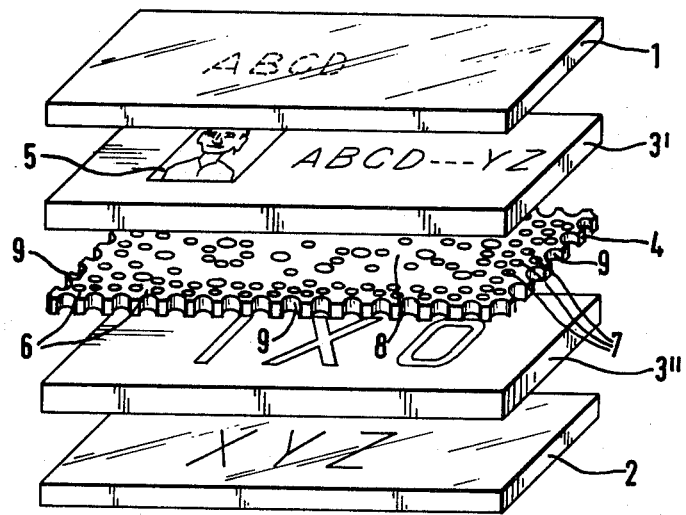

LAMINATED IDENTITY CARD HAVING SEPARATION-RESISTANT LAMINAE AND METHOD OF MANUFACTURING SAME

This invention relates to an identity card comprising at least one outer transparent thermoplastic cover layer and a thermoplastic card core and containing at suitable points on at least one layer information which serves to identify the cardholder and additional security markings, such as guilloche figures, as a protection against forgeries. The invention further relates to a method of manufacturing the identity card.

BACKGROUND OF THE INVENTION

Cards of this type are used as personal identification cards, check cashing cards, drivers licenses, credit cards, payment cards, passport cards and similar certificates of identity. In order to prevent falsifications by partial alterations of the personal data, these cards must, to a large extent, be protected against any separation of the card laminate into the individual layers which carry personal data and, generally, also a photograph of the cardholder.

Identity cards are known which are manufactured in the form of a fused laminate in which a card core carrying the information is protected by transparent films of a different nature from the card core. German Offenlegungsschrift No. 2,308,876 discloses an identity card consisting of a relatively thick carrier film and a thin transparent film, between which there is a special paper having internal features, such as watermarks, banknote printings or the like, which serve as a protection against forgeries and cause differences in the thickness of the paper. The three layers are laminated together in such a way that the internal features are manually, mechanically and/or visually detectable through the transparent film. Further markings which serve to identify the cardholder are provided at a suitable point on this known identity card. For example, a photograph in the form of a film transparency is inserted during lamination between the special paper and the carrier film and is firmly bonded to the special paper. Furthermore, it is possible, at any desired point on the front or rear of the identity card, to laminate onto the outside of the plastic material a strip of special paper, printed according to security technology, as a field for later insertion of signatures or other handwritten entries.

German Auslegeschrift No. 2,163,943 discloses a personal identity card comprising a combination of a support layer, an electrically conductive layer, a barrier layer, a photoconductive layer with an organic photoconductor, an optional cover layer, a protective layer on the photoconductive layer or on the cover layer, a protective layer on the rear of the support layer and an optional cover layer on the last-mentioned protective layer. In this personal identity card, a number of different materials are assembled to produce a laminate which, due to the lack of homogeneity of the individual layers, can be split up so that it is possible to carry out forgeries.

It is apparent that maximum protection against forgeries is achieved by a combination of different security markings and by a card comprising a laminate of layers which resist any attempt to separate them into individual layers and thus prevent any tampering with the information and security markings applied to the layers. For this purpose, German Patent Application No. 28 38 795.3 discloses a composite card core and an upper and a lower cover layer, composed of polymers which are capable of being thermally fused into a laminate. Due to the corresponding consistency of all layers in the laminate, it is impossible to split up such an identity card without destroying the security markings applied to the card core. These security markings include safety prints, for example, made up of intertwined linear patterns, watermarks on papers, photographs of the cardholder and the like. If, contrary to all expectations, someone should succeed in separating the card laminate without damaging the individual layers, it would then be technically easy to counterfeit, imitate or exchange security markings of this kind.

The layers of identity cards of this type are united by laminating at relatively high temperatures and pressures, and this involves the risk of an intolerable melting of the laminates caused by the high temperatures. As a result, the information and/or data on the card may no longer be legible.

SUMMARY OF THE INVENTION

It is an object of the present invention to provide an identity card which is protected against forgery or alteration.

A further object of the present invention is to provide a multi-layer identity card wherein the layers of the card are resistant to separation.

Another object of the present invention is to provide a multi-layer identity card wherein the information carried by the card is not subject to distortion when the layers are laminated to each other.

It is also an object of the present invention to provide an identity card which is dimensionally stable at elevated temperatures and pressures used to bond the layers of the card to each other.

A further object of the present invention is to provide an identity card wherein the information to be carried by the card may be printed thereon by electrophotographic or electrographic techniques.

It is also an object of the present invention to provide an identity card wherein the information to be carried by the card may be applied in a single step.

According to the invention, these and other objects are achieved by providing an identity card comprising at least one outer transparent thermoplastic cover layer laminated to a thermoplastic core; said card carrying at suitable points on at least one layer information serving to identify the cardholder and security markings for protecting against forgeries, said cover layer and said core being formed of fusible thermoplastic polymeric material, said core further comprising a reinforcing support layer which is dimensionally stable under the conditions used to laminate the layers to each other. The core layers and the two cover layers are comprised of a fusible polyvinyl chloride polymer, and the core layers enclose a reinforcing or support layer of a material which is interposed therebetween.

The support layer is permeable to the fusible material of the core layers, i.e., the support layer is perforated, porous and/or provided with holes.

In one embodiment of the invention, the support layer contains holes having diameters ranging from about 0.5 to about 2 mm, and the average distance between the centers of adjacent holes is about three times the mean value of the radii of the holes. The holes in the support layer may be arranged to form a national emblem, a heraldic figure or a random pattern, thereby constituting a security marking.

The identity card is manufactured by laminating the core layers enclosing the support layer with the cover layers at a temperature of at least 160° C. and at bonding pressures of 20 bars (kg/cm$^2$) or more. Preferably, a temperature of 180° C. and a bonding pressure of 40 bars are employed during laminating.

BRIEF DESCRIPTION OF THE DRAWINGS

The invention will be described in further detail with reference to the accompanying drawings, wherein:

FIG. 1 is a sectional view of an identity card comprising a core layer having cover layers laminated thereto; and FIG. 2 is an exploded view of the identity card of FIG. 1 prior to laminating.

DETAILED DESCRIPTION OF PREFERRED EMBODIMENTS

FIG. 1 shows a sectional view of the identity card. The card core is made up of the core layers 3' and 3" to which cover layers 1 and 2 of transparent films are laminated on both sides. The core layers 3' and 3" and also the cover layers 1 and 2 comprise a polyvinyl chloride material. A support layer 4 made of a material which is dimensionally stable under the laminating conditions is sandwiched between the two core layers 3' and 3". Since the support layer 4 is perforated, porous and/or provided with holes, it is permeable to the fusible material of the core layers 3' and 3". The holes 7 in the support layer 4 generally have varying diameters.

As seen in FIG. 2, the upper core layer 3' carries a security marking 5. In the illustrated embodiment, the security mark is a photograph of the cardholder. Beside this security marking, the core layer is printed with data, represented by the capital letters A, B, C, D . . . Y, Z. The surface of the core layer 3' may be printed by techniques corresponding to electrophotographic copying processes using photoconductive layers or corresponding to electrographic copying processes using recording electrodes. In each case, toner images are produced which, in electrophotographic copying processes, are transferred to the core layer 3' or, in electrographic processes, are produced directly on the core layer 3' with the aid of the recording electrodes and a subsequent toner application.

If appropriate, the directly readable information on the core layer 3' may be applied over the top of a safety print provided on layer 3'. The lower core layer 3" carries a safety print of this kind, which is indicated by the letters I, X and O.

Due to the high temperatures of up to 180° C. and the high bonding pressures ranging between 40 and 60 bars applied during press-bonding of the core layers 3' and 3" with the cover layers 1 and 2, there is a risk that the cards or the laminate may melt in the course of laminating and that the information may become blurred as a result, so that the identity card as such will be useless. This risk is prevented by the support layer 4, because the material of the core layers 3' and 3" fills the perforations or holes 7 in the support layer 4 during laminating and produces a firm bond, through these perforations or holes, between the material of the core layers on either side of the support layer 4.

The core layers 3' and 3" enclosing the support layer 4 are laminated to the cover layers 1 and 2, preferably at or above a temperature of 160° C. and at bonding pressures of 20 bars or more. Preferably, a temperature of 180° C. and a bonding pressure of 40 bars are employed. During the course of laminating, higher temperatures and higher bonding pressures result in a continuous decrease in the separability of the laminate. The support layer 4 may, for example, be paper, perforated polyester film or fine fabrics as used, for example, for screen prints. The diameters of the holes 7 provided in the support layer 4 may range from fractions of a millimeter to a few millimeters. Good results are obtained with a support layer 4 comprised of paper perforated with holes 7 having a diameter of 2 mm. For example, an identity card having the dimensions 125 mm×99 mm has been manufactured, which is inseparable and free of distortions and is built up as follows:

The upper cover layer 1 is a transparent polyvinyl chloride film having a thickness of about 120 μm. The core layer 3' comprises a printed, flat-white polyvinyl chloride film of 150 μm thickness. The support layer 4 is made of paper provided with holes 2 mm in diameter; the distance between the centers of adjacent holes being about 3 mm and the paper having a thickness of 150 μm. The second core layer 3" is a flat-white polyvinyl chloride film of 140 μm thickness. The lower cover layer 2 is a transparent polyvinyl chloride film of 120 μm thickness. Lamination of the respective layers into an inseparable card is carried out at 160° C. using a bonding pressure of approximately 30 bars for a period of 5 minutes. Use of a temperature as high as 180° C. and a bonding pressure of as much as 40 bars does not result in any distortion of the intermediate layers.

The perforated portion of support layer 4 should be as large as possible. Preferably, the holes 7 in the support layer have diameters ranging from 0.5 to 2 mm, with the average distance between the centers of adjacent holes being equal to three times the value of the radii of the holes, if the holes are equal in size. In the case of adjacent holes of different diameters, the average distance between the centers should correspond to three times the mean value of the radii of the two holes.

The holes may be arranged in such a way that the arrangement itself constitutes a security marking. For example, the holes may be distributed in a random pattern with irregular distances and radii which are known only to the manufacturer of the identity cards, so that only the manufacturer himself is capable of reproducing the pattern exactly. It is also possible to distribute the holes in a particular geometric configuration, such as the shape of a heraldic figure, a national emblem or a seal. To enhance the resistance to forgeries, the material of the support layer 4 itself may carry further security markings. For example, so-called safety papers with safety prints and/or watermarks may be used. As is shown in FIG. 2, the perforated portion of the area of the support layer 4 is larger in the marginal zone 6 than in the central zone 8. Along its edges 9, the support layer 4 is especially heavily perforated, so that it does not offer any starting point for a separation of the card laminate along the outer edges of the identity card.

Since the cover layers 1 and 2 may be provided with images according to copying techniques or are easily printable, the insides of the cover layers facing the core layers 3' and 3" may be provided with information and security markings.

Other known security markings, such as holograms, special internal safety prints or coded personal data may also be incorporated into the identity card.

Not only the personal data, but also the photograph of the cardholder may be applied as a toner image by electrophotographic or electrographic techniques.

The foregoing embodiments have been described merely as examples of the invention and are not intended to be limiting. Since modifications of the disclosed embodiments within the scope and spirit of the invention may occur to persons skilled in the art, the scope of the invention is to be limited solely by the scope of the following claims.

What is claimed is:

1. An identity card comprising at least one outer transparent thermoplastic cover layer formed of thermoplastic polymeric material laminated to a thermoplastic polymeric material core; said card carrying at suitable points information serving to identity the cardholder and security markings for protecting against forgeries; said core further comprising a perforated reinforcing support layer which is dimensionally stable under the conditions used to laminate the thermoplastic polymeric material and permeable to the thermoplastic polymer of the core, wherein marginal areas of the support layer are more heavily perforated than a central area of the support layer.

2. Identity card according to claim 1, wherein the support layer is perforated along the edges thereof.

3. An identity card comprising at least one outer transparent thermoplastic cover layer formed of thermoplastic polymeric material laminated to a thermoplastic polymeric material core; said card carrying at suitable points information serving to identify the cardholder and security markings for protecting against forgeries; said core further comprising a reinforcing support layer which is dimensionally stable under the conditions used to laminate the thermoplastic polymeric materials and permeable to the thermoplastic polymer of the core, said support layer being provided with holes having varying diameters ranging from about 0.5 to about 2 mm, and the average distance between the centers of adjacent holes being equal to three times the mean value of the radii of the holes.

4. Identity card according to claim 3, wherein the holes in the support layer are arranged to constitute a security marking.

5. Identity card according to claim 4, wherein said holes are arranged in a random pattern.

6. Identity card according to claim 4, wherein said holes are arranged to form an emblem or figure.

7. Identity card according to claim 1 or 3 comprising a top cover layer and a bottom cover layer.

8. Identity card according to claim 1 or 3, wherein said security markings comprise at least one guilloche figure.

9. Identity card according to claim 1 or 3, wherein said fusible polymeric material is formed of thermoplastic polyvinyl chloride.

10. A method of manufacturing an identity card according to claim 1 or 3 wherein the support layer is enclosed between a pair of core layers and the layers are laminated to each other at a temperature of at least 160° C. and a bonding pressure of at least 20 bars.

11. Method according to claim 10, wherein the laminating temperature is about 180° C. and the bonding pressure is about 40 bars.

12. An identity card comprising at least one outer transparent cover layer formed of thermoplastic polymeric material laminated to a thermoplastic polymeric material core; said card carrying at suitable points information serving to identify the cardholder and security markings for protecting against forgeries; said core comprising two thermoplastic core layers laminated to each other with a reinforcing support layer interposed therebetween, said support layer being dimensionally stable under the conditions used to laminate the thermoplastic polymeric materials and permeable to the thermoplastic polymer material of the core layers, the thermoplastic polymer material of said core layers permeating said support layer and producing a firm bond therethrough between the respective core layers.

13. Identity card according to claim 12, wherein the support layer comprises paper perforated with holes having a diameter of about 2 mm.

* * * * *